United States Patent [19]
Green et al.

[11] 3,958,295
[45] May 25, 1976

[54] BACKING MEMBERS FOR USE IN WINDSHIELD WIPERS

[75] Inventors: Donald M. Green, Burlington; George R. McDonald, Mississauga, both of Canada

[73] Assignee: Tridon Limited, Burlington, Canada

[22] Filed: Oct. 3, 1972

[21] Appl. No.: 294,716

[52] U.S. Cl. .......................... 15/250.39; 15/250.42
[51] Int. Cl. .............................................. B60s 1/38
[58] Field of Search ....... 15/250.36, 250.42, 250.39, 15/250.41, 250.38

[56] References Cited
UNITED STATES PATENTS

| | | | |
|---|---|---|---|
| 2,663,043 | 12/1953 | Oishei | 15/250.39 |
| 3,099,031 | 7/1963 | Ludwig | 15/250.42 |
| 3,116,510 | 1/1964 | Oishei et al. | 15/250.42 |
| 3,121,903 | 2/1964 | Ludwig | 15/250.42 |
| 3,408,680 | 11/1968 | Heller | 15/350.42 |
| 3,545,028 | 12/1970 | Poland | 15/250.36 |

FOREIGN PATENTS OR APPLICATIONS
524,165 7/1940 United Kingdom ............. 15/250.36

*Primary Examiner*—Peter Feldman
*Attorney, Agent, or Firm*—Hirons & Rogers

[57] ABSTRACT

A windshield wiper backing member is slotted for the reception of a squeegee and is provided with breakage indicators along its length to permit it to be used as a "universally applicable" member with different sizes of superstructure. The backing member and the squeegee are both cut to size and the open end of the backing member closed by a plug after the squeegee is threaded therein. The backing member is provided with opposed side slots, the slots and the parts of the backing member between the slots and the member upper face being dimensioned to be operative with two different types of claw connecting the backing member to the superstructure.

4 Claims, 6 Drawing Figures

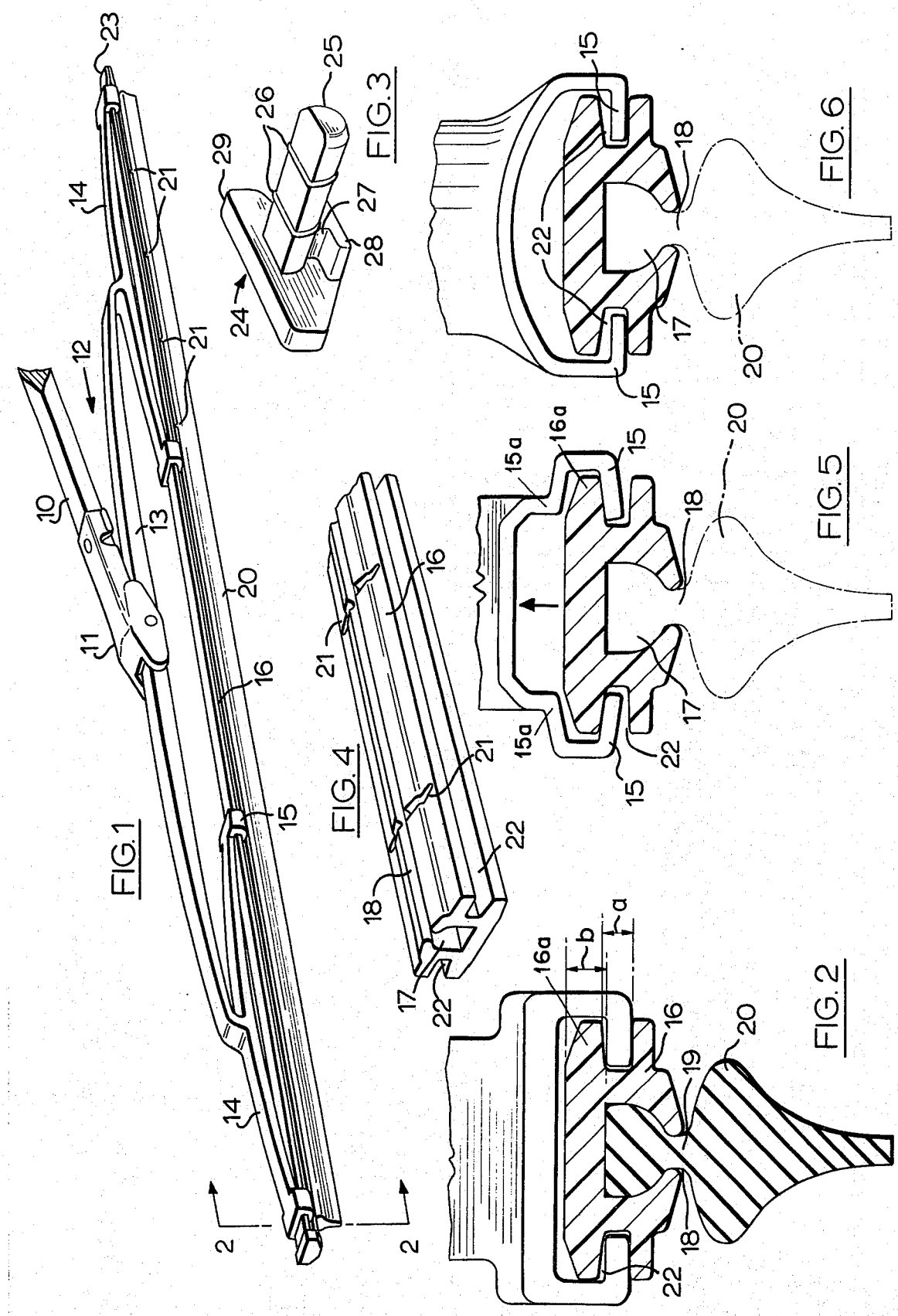

BACKING MEMBERS FOR USE IN WINDSHIELD WIPERS

FIELD OF THE INVENTION

The present invention is concerned with improvements in or relating to backing members for use in windshield wipers.

REVIEW OF THE PRIOR ART

Windshield wipers for automobile use now almost universally consist of an elongated squeegee supported by means of a backing member in a superstructure attached to a motor driven arm. The squeegee is of soft rubber or rubber-like material and contacts the windshield to produce the desired water-removing wiping action. The backing member is relatively flexible in directions perpendicular to the windshield surface, so that the squeegee readily conforms thereto, and is very much less flexible in directions parallel to the surface, so as to hold the squeegee relatively straight in its longitudinal direction as it is moved to-and-fro over the surface. The wiper arm usually is spring-biased to urge the squeegee against the windshield with the appropriate force, and the force provided by the arm at its connection with the superstructure is distributed by the superstructure, and by the backing member also, over the full length of the squeegee.

The useful life of the arm and superstructure is considerably greater than that of the squeegee, and it is the common practice at this time to replace the squeegee and its backing member as a unitary assembly, the connection between the backing member and the superstructure being made readily separable for that purpose. At the present time there are seven common lengths of windshield wiper in use in North America, and samples of each size must be stocked by a supplier if full service is to be given, with the resultant additional problem of deciding what ratio of the different sizes is best suited to giving maximum availability from stock without excessive inventory. The problem is compounded by the presence of more than one make of windshield wiper, since a comparable stock must then be provided for each make.

DEFINITION OF THE INVENTION

It is an object of the invention to provide a new windshield wiper backing member usable with wipers of different lengths.

It is another object to provide a new windshield wiper backing member usable with different types of superstructure.

In accordance with the present invention there is provided in a windshield wiper assembly comprising a backing member, a squeegee whose length can be reduced by severing thereof retained and supported by the backing member, and a superstructure to which the backing member is attached, a backing member consisting of an elongated body of uniform cross-section along its length having a first channel extending along its length for the retaining reception therein of the said squeegee upon endwise movement of the squeegee into the channel through one end of the backing member, and having opposed second and third channels extending parallel to the first channel for the reception of longitudinally spaced pairs of opposed claws of the said superstructure by feeding the said one end of the backing member between the opposed claws of each pair thereof, the said backing member being provided at predetermined positions along its length with breakage indications for shortening of the backing member to a corresponding required length, removable stop means at the said one end of the backing member closing the respective ends of the three channels both before and after shortening of the backing member, and stop means at the other end of the backing member closing the respective other ends of the three channels.

DESCRIPTION OF THE DRAWINGS

Particular preferred embodiments of the invention will now be described, by way of example, with reference to the accompanying drawings, wherein:

FIG. 1 is a perspective view of one form of a complete windshield wiper,

FIG. 2 is a transverse cross section taken on the line 2—2 of FIG. 1 and drawn to a larger scale, FIG. 3 is a perspective view to an enlarged scale of a plug for closing the open end of a backing member, FIG. 4 is a perspective view of a part of the backing member from below to show a detail, and FIGS. 5 and 6 are cross sections to an enlarged scale to show the manner in which the backing member is retained in different forms of superstructure claw.

DESCRIPTION OF THE PREFERRED EMBODIMENTS

FIG. 1 illustrates a complete windshield wiper constituted by a motor-driven arm 10 removably attached by a clip 11 to a superstructure 12. In this particular embodiment the superstructure is illustrated as comprising a main yoke member 13, which is connected at its ends approximately to the centre points of two subsidiary yoke members 14. The end of each subsidiary yoke member is provided with a pair of claws 15 embracing a backing member 16. Any other form of superstructure can of course be employed, but it is now almost universal practice in the windshield wiper art in wipers of this type for the backing member to be retained to the super structure by means of such longitudinally-spaced embracing pairs of claws.

The backing member illustrated preferably is formed by an extrusion operation from a suitable polymeric material having the necessary properties of strength, resilience, weather-resistance, etc., and polycarbonate materials have been found especially suitable for this application. The body of the backing member has a first longitudinal channel 17 formed therein opening to what is called herein for convenience in description the lower face of the backing member. The mouth 18 of the channel to the said lower face is of smaller width than the remainder of the channel to constitute a slot for the retaining reception therein of the corresponding waist portion 19 of a squeegee 20. The backing member is provided along its length at predetermined positions with breakage indications 21 whose functions will be described below. In this particular embodiment these breakage indications are constituted by shallow slots formed in the said backing member lower face and therefore also constitute local minor weakenings of the member facilitating deliberate breakage at these points.

The claws 15 are engaged in second and third channels 22 respectively formed in the backing member and extending parallel to the squeegee-receiving channel 17 on opposite sides thereof, the openings of the channels to the respective side faces constituting respective slots therein for the reception of the claws. The channels 22 are of maximum width $a$ at the side face with a slight taper inwards, while the thickness of the backing member $b$ between the upper member face and the nearest parallel channel face is a maximum at the base of the channel and tapers outwards. One end 23 of the member is mechanically distorted, e.g. by a heating and/or pressing operation to close all three channels, thereby providing a stop member engagable with the immediately adjacent pair of claws and the adjacent end of the squeegee.

In operation of the invention a refill for any length of windshield wiper and for the majority of the makes currently available comprises a backing member in accordance with the invention of the longest length required, a squeegee of the same length and an end closure plug 24. If the backing member is too long for the superstructure than the purchaser breaks the member at the appropriate break indication, which may have a suitable length indication provided immediately adjacent thereto, and cuts the squeegee to appropriate length. It is found that the preferred polycarbonate materials besides having the necessary properties mentioned above are somewhat brittle and, despite their high strength, can readily be broken cleanly with the provision of a relatively shallow notch as a break indicator. The squeegee is then threaded into the channel 17 and the assembled backing member and squeegee are mounted in the superstructure by sliding the backing member broken end first into the pairs of claws. The channel open ends are then closed with the plug 24 which constitutes a corresponding stop member for the claws and the squeegee.

The end plug illustrated comprises a shaft 25 that is an interference fit in the channel 17 to retain the squeegee; the plug may in addition be provided along its length with transverse protrusions 26 that frictionally engage the channel walls to more firmly retain the plug therein. A web 27 fills the slot 18 and connects the shaft 25 to a cross-bar 28. A plate 29 is provided at the ends of the shaft 25, the web 27 and the cross-bar 28 and extends over the ends of the channels 17 and 22 retaining the claws in the channels 22. The assembly of backing member and squeegee can be removed from the superstructure when required, and the squeegee removed from the backing member, following forcible removal of the end plug.

Referring now especially to FIGS. 5 and 6, FIG. 5 illustrates the way in which a backing member of the invention is usable with one type of claw pair encountered in commercial practice. The part 16a of the backing member 16 between the upper face thereof and the immediately adjacent upper side faces of the channels 22 is inwardly tapered away from the longitudinal centre line of the member and the thickness dimension $b$ is made such that the claws closely operatively embrace the part 16a. This operative embodiment is such that the assembly is retained securely in the superstructure in the attitude necessary for proper operation in all its possible operating modes as it is swept to and fro across the windshield. It will be noted that in this embodiment each claw has a part 15a which is engagable with the upper face of the backing member when that member has moved in the direction of the arrow to its extreme uppermost position between the claws, so that (as described above) its attitude is controlled and, in particular, the extent of the tilt of the backing member in the claws relative to the superstructure is controlled by this engagement of the claws with these inwardly tapering faces of the part 16a.

FIG. 6 illustrates the co-operation of the backing member with another type of claw pair wherein the claw is so shaped that there is no possibility of contact of the claw with the backing member upper face. The channels 22 are tapered outwardly away from the longitudinal centre line of the member and the maximum depth dimension $a$ of the outermost part of the channels is such that the claw rides within the channel and operates to retain the backing member/squeegee assembly securply on the superstructure in the necessary attitude without excessive tilting relative to the superstructure for all operating modes, as with the other type of claw.

We claim:

1. In a windshield wiper assembly comprising a backing member, a squeegee whose length can be reduced by severing thereof retained and supported by the backing member, and a superstructure to which the backing member is attached, a backing member consisting of an elongated body of uniform cross-section along its length having a first channel extending along its length for the retaining reception therein of the said squeegee by endwise movement of the squeegee into the channel through one end of the backing member, and having opposed second and third channels extending parallel to the first channel for the reception of longitudinally spaced pairs of opposed claws of said superstructure by feeding the said one end of the backing member between the opposed claws of each pair thereof, the said backing member being provided at predetermined positions along its length with breakage indications for shortening of the backing member to a corresponding required length, removable stop means at the said one end of the backing member closing the respective ends of the three channels both before and after shortening of the backing member, and stop means at the other end of the backing member closing the respective other ends of the three channels.

2. The invention as claimed in claim 1, wherein the said removable stop means comprises a plug insertable in the said one end of the first channel to be frictionally retained therein to close the end of that channel and also constituting a stop member closing the open ends of the said second and third channels.

3. The invention as claimed in claim 2, wherein the said backing member body is of extruded plastic material and the said other end of the body is mechanically distorted to provide the corresponding stop means closing the channel ends to prevent endwise movement of the squeegee and claw pairs therein.

4. A backing member as claimed in claim 1, wherein the backing member body part between the body upper face and the corresponding upper faces of the said second and third channels is inwardly tapered away from the longitudinal centre line of the member and is of thickness such that the body parts are operatively embraced by associated superstructure claws of corresponding shape for retention of the member against excessive tilting for proper operating attitude on the associated superstructure, and wherein the second and third channels are outwardly tapered away from the said longitudinal centre line and are of maximum depth such that the walls thereof are operatively engaged by associated superstructure claws of an associated superstructure with the backing member retained thereon against excessive tilting for proper operative attitude by the engagement of the claws with the corresponding faces of the second and third channels.

\* \* \* \* \*